(12) United States Patent
Dwelley et al.

(10) Patent No.: US 7,863,772 B2
(45) Date of Patent: Jan. 4, 2011

(54) BALANCING CURRENT DRAWN FROM MULTIPLE POWER SUPPLY INPUTS USING MULTIPLE-INPUT INDUCTORS

(75) Inventors: David McLean Dwelley, Santa Barbara, CA (US); David Bundy Bell, Los Altos Hills, CA (US)

(73) Assignee: Linear Technology Corporation, Milpitas, CA (US)

( * ) Notice: Subject to any disclaimer, the term of this patent is extended or adjusted under 35 U.S.C. 154(b) by 208 days.

(21) Appl. No.: 11/444,400

(22) Filed: Jun. 1, 2006

(65) Prior Publication Data
US 2007/0281754 A1    Dec. 6, 2007

(51) Int. Cl.
*H02J 3/38*    (2006.01)
(52) U.S. Cl. ....................................................... 307/19
(58) Field of Classification Search ............... 307/43, 307/14, 19, 20
See application file for complete search history.

(56) References Cited

U.S. PATENT DOCUMENTS

| | | | |
|---|---|---|---|
| 6,768,658 B2 * | 7/2004 | Perry | 363/65 |
| 6,822,427 B2 * | 11/2004 | Wittenbreder | 323/282 |
| 7,149,096 B2 * | 12/2006 | Batarseh et al. | 363/16 |
| 7,285,873 B2 * | 10/2007 | Brault | 307/19 |
| 2004/0184289 A1 | 9/2004 | Vinciarelli | |
| 2005/0085212 A1 * | 4/2005 | Peker et al. | 455/402 |
| 2005/0197094 A1 | 9/2005 | Darshan et al. | |
| 2005/0225178 A1 * | 10/2005 | Shao et al. | 307/129 |
| 2006/0238250 A1 * | 10/2006 | Camagna et al. | 330/253 |
| 2007/0263675 A1 * | 11/2007 | Lum et al. | 370/910 |

FOREIGN PATENT DOCUMENTS

GB    2 407 882 A    5/2005

* cited by examiner

*Primary Examiner*—Michael Rutland Wallis
(74) *Attorney, Agent, or Firm*—McDermott Will & Emery LLP

(57) ABSTRACT

Novel techniques for balancing current drawn from multiple power supply inputs. A multiple-input inductor is coupled between the power supply inputs and the switching circuits associated with the respective power supply inputs for balancing voltages applied to each of the switching circuits.

19 Claims, 6 Drawing Sheets

BALANCING CURRENT DRAWN FROM MULTIPLE POWER SUPPLY INPUTS USING MULTIPLE-INPUT INDUCTORS

TECHNICAL FIELD

This disclosure relates to power supply systems, and more particularly, to balancing current drawn from multiple power supply inputs using multiple-input inductors.

BACKGROUND ART

Devices having multiple power supply inputs may balance current drawn from these inputs to draw maximum power from all supplies without overloading individual inputs. Typically, the current balancing is performed using either resistive ballasting or active balancing.

Resistive ballasting involves adding series resistance to each input. As the current draw on one input increases, the voltage drop across the resistance on that input increases proportionally, decreasing the voltage available to the device from that input and causing it to draw more current from the other inputs. However, resistive ballasting tends to waste power in the resistors, especially when two input voltages are significantly different from each other.

Active balancing typically involves inserting a resistor in series with each input and measuring the current in each input across this resistor. The resulting signals are used to actively adjust individual regulators attached to each input to increase or decrease their percentage of the total current draw. This technique typically improves efficiency over the resistor ballasting scheme, but it is complicated and typically involves a large amount of specialized circuitry.

Therefore, it would be desirable to develop simple and efficient techniques for balancing a current draw from multiple power supply inputs.

SUMMARY OF THE DISCLOSURE

The present disclosure offers novel techniques for balancing current drawn from multiple power supply inputs.

In accordance with one aspect of the disclosure, a power supply circuit having multiple power supply inputs includes multiple switching circuits associated with the respective power supply inputs, and a multiple-input inductor coupled between the power supply inputs and the switching circuits for balancing voltages applied to each of the switching circuits.

The inductor may be configured to draw equal amounts of current from the power supply inputs. The multiple switching circuits may be controlled to provide a common switching duty cycle.

Alternatively, the power supply circuit may be configured to maintain values of input currents drawn from the power supply inputs at a predetermined ratio.

Each of the switching circuits may comprise a switching regulator. For example, each switching regulator may have a flyback configuration. Alternatively, each switching regulator may have a buck configuration, a boost configuration, or a buck/boost configuration. Also, the switching regulators may be implemented as forward converters.

Each switching regulator may include a transformer. Alternatively, instead of a transformer, each switching regulator may have an inductor.

In accordance with an exemplary embodiment of the disclosure, the circuit may have two power supply inputs. A dual-winding inductor may be coupled between the inputs and respective switching circuits controlled by a common switching signal.

In accordance with another exemplary embodiment of the disclosure, the circuit may have first, second and third power supply inputs, and include first, second and third switching circuits respectively coupled to the first, second and third power supply inputs.

The dual-winding inductor may be coupled between the first and second power supply inputs, and the first and the second switching circuits; and an additional dual-winding inductor may be coupled between the second and third power supply inputs, and the second and third switching circuits. The second power supply input may be configured as a master input, and the first and third power supply inputs may be configured to provide input signals matching an input signal at the second power supply input.

In accordance with a further exemplary embodiment, a first dual-winding inductor may be coupled between the first and second power supply inputs, and the first and second switching circuits; a second dual-winding inductor may be coupled between the second and third power supply inputs, and the second and third switching circuits; and a third dual-winding inductor may be coupled between the first and third power supply inputs, and the first and third switching circuits.

The circuit of the present disclosure may support various arrangements of power supply inputs, including power supply inputs that share a common ground, power supply inputs that share a common power supply and use separate grounds, or power supply inputs electrically isolated from each other.

The switching circuits may be connected to provide a single power supply output or multiple power supply outputs.

In accordance with a further aspect of the disclosure, the power supply circuit of the present disclosure may be incorporated into a system for supplying power to a powered device over a communication link, such as Ethernet cabling, having a first wire set and a second wire set. The power supply circuit may balance signals supplied to the powered device from the first and second wire sets.

In accordance with one method of the present disclosure, the following steps are carried out to balance current drawn from multiple power supply inputs:

converting voltages supplied from the power supply inputs using respective switching circuits, and balancing voltages applied to the switching regulators from the power supply inputs using a multiple-input inductor.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

Although the present disclosure uses the example of balancing current or power in a Power over Ethernet (PoE) environment, one skilled in the art would realize that the disclosed circuitries and methodologies are applicable to any system that draws power from two or more inputs.

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard describes a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras have required two connections: one to a LAN and another to a power supply system. The PoE system eliminates the need for additional outlets and wiring to supply power to network devices. Instead, power is supplied over Ethernet cabling used for data transmission.

Figure 1:
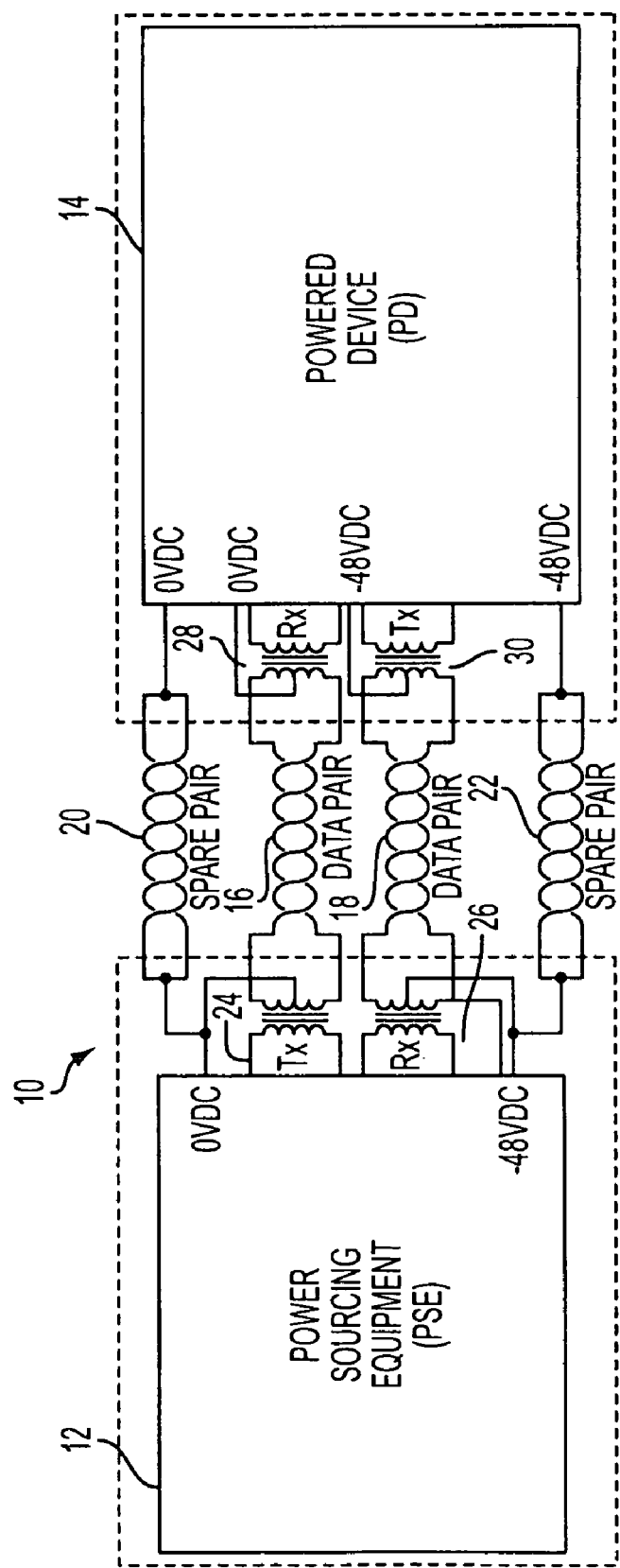
FIG. 1 is a diagram illustrating a Power over Ethernet system having two wire sets for supplying power to a powered device.

FIG. 1 shows a simplified block-diagram illustrating a Power over Ethernet (PoE) system 10 including a PSE 12 that may provide power to a PD 14 over an Ethernet link segment having four twisted pairs of conductors—data pairs 16 and 18 and spare pairs 20 and 22. The data pairs 16 and 18 are respectively provided between data transformers 24 and 26 on the PSE side and data transformers 28 and 30 on the PD side. These data transformers may be used for connecting physical layer (PHY) devices involved in the Ethernet data transmission. The PSE 12 may have multiple ports connectable to multiple PDs 14 via respective Ethernet links The PSE 12 may interact with each PD 14 in accordance with the IEEE 802.3af standard. In particular, the PSE 12 and the PD 14 participate in the PD detection procedure, during which the PSE 12 probes a link to detect the PD. If a PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD will not accept power.

If the signature is valid, the PD has an option of presenting a classification signature to the PSE to indicate how much power it will draw when powered up. For example, a PD may be classified as class 0 to class 4. Based on the determined class of the PD, the PSE applies the required power to the PD.

A 802.3af standard PoE system supports transferring power only over two pairs of conductors, either over the data pairs 16 and 18 or over the spare pairs 20 and 22. However, due to the resistance and associated heating of the Ethernet cabling system, only a limited amount of power may be delivered over 2 pairs of conductors.

To provide more power to a PD, it would be desirable to use more wires in the Ethernet cable. In particular, power transferred from the PSE 12 to the PD 14 may be applied to both data and spare pairs of conductors of the same Ethernet link segment simultaneously to reduce the cable system resistance. As a result, the PSE 12 may be enabled to support high-power PDs requiring more power than available in accordance with the 802.3af standard. For example, a 48V DC voltage may be simultaneously applied from the PSE 12 to the data pairs 16 and 18, and the spare pairs 20 and 22 provided within an Ethernet link segment between the PSE 12 and the PD 14.

Figure 2:
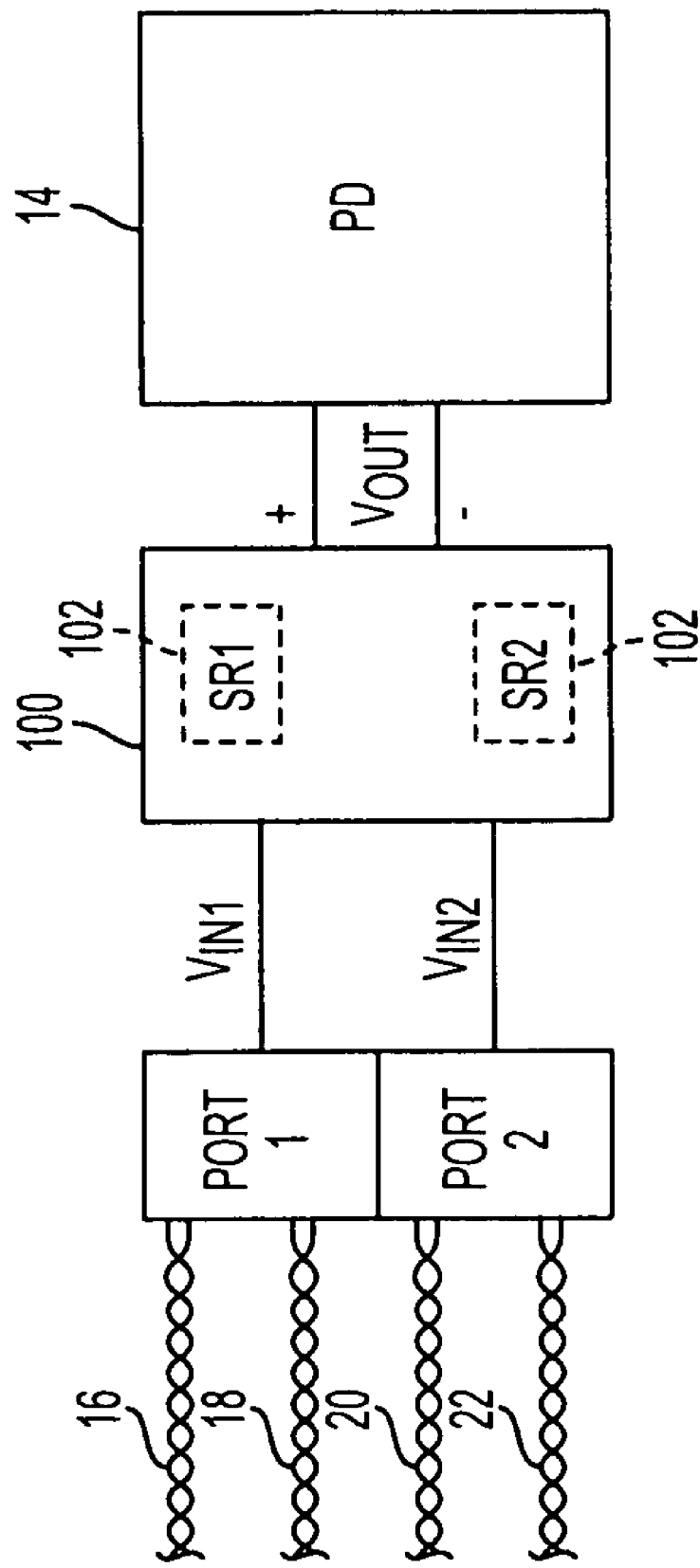
FIG. 2 is a diagram illustrating circuitry of the present disclosure for balancing power or current supplied from the two wire sets to the powered device.

FIG. 2 schematically illustrates the PD 14 that receives power from input port 1 supplied via the data pairs 16 and 18, and input port 2 supplied via the spare pairs 20 and 22. Balancing circuitry 100 is connected between the input ports 1 and 2, and the PD 14 to balance power or current supplied from the input ports. For example, the balancing circuitry 100 may cause equal amounts of power or current to be drawn from the input ports 1 and 2 to maximize the power which the PD 14 may draw from the PSE 12 without overloading either input. The balancing circuitry 100 may be arranged either outside or inside the PD 14. Although in the example illustrated in FIG. 2, the balancing circuitry 100 has two power supply inputs and a single power supply output, one skilled in the art will realize from the disclosure presented below that the balancing circuitry of the present disclosure may have more than two inputs and multiple outputs.

The balancing circuitry 100 includes a switching regulator (SR) 102 for each power supply input, and associated circuitry operating together with the switching regulators 102 to balance power or circuit drawn from the power supply inputs. For example, FIG. 2 shows switching regulators SR1 and SR2 respectively supporting input port 1 and input port 2. Outputs of the switching regulators 102 may be connected to produce one or more output DC voltages Vout in response to input DC voltages $V_{IN1}$ and $V_{IN2}$ applied to the respective regulators.

Each of the switching regulators 102 may have a flyback configuration that enables generation of an output DC voltage less than or greater than an input DC voltage. As well known to one skilled in the art of switching regulators, a flyback switching regulator may provide a single output DC voltage, as well as multiple output DC voltages. Moreover, the switching regulators 102 may operate in a continuous mode as well as in a discontinuous mode.

Alternatively, each switching regulator 102 may be arranged in a buck configuration to reduce an input DC voltage to a lower output DC voltage, in a boost configuration to provide an output DC voltage higher than an input DC voltage, or in a buck/boost configuration to generate an output DC voltage opposite in polarity with respect to an input DC voltage. Further, each of the switching regulators 102 may be implemented as a forward DC-DC converter that directly transfers energy from the power supply input to the load during the on-time of the power switch.

Although the balancing circuitry 100 in FIG. 2 illustrates the example of balancing current or power drawn from twisted-wire pairs of the Ethernet cabling, the balancing circuitry of the present disclosure may be implemented for supporting any system that draws power or current from two or more power supply inputs. For example, the balancing circuitry of the present disclosure may support power supply inputs that share a common ground, power supply inputs that share a common power supply and use separate grounds, and power supply inputs electrically isolated from each other.

Moreover, the balancing circuitry of the present disclosure may be configured to draw equal current or power from each of the power supply inputs. Alternatively, any desired ratio may be set for amounts of current or power drawn from different power supply inputs.

FIGS. 3A-3E illustrate balancing circuitry of the present disclosure that utilizes one switching regulator for each input and one or more multiple-input inductors coupled to the switching regulators to force voltages at the inputs of the switching regulators to be equal. Each of the switching regulators are controlled to run with the same switching duty cycle so as to equalize the current drawn from the inputs with matched voltages.

Figure 3A:
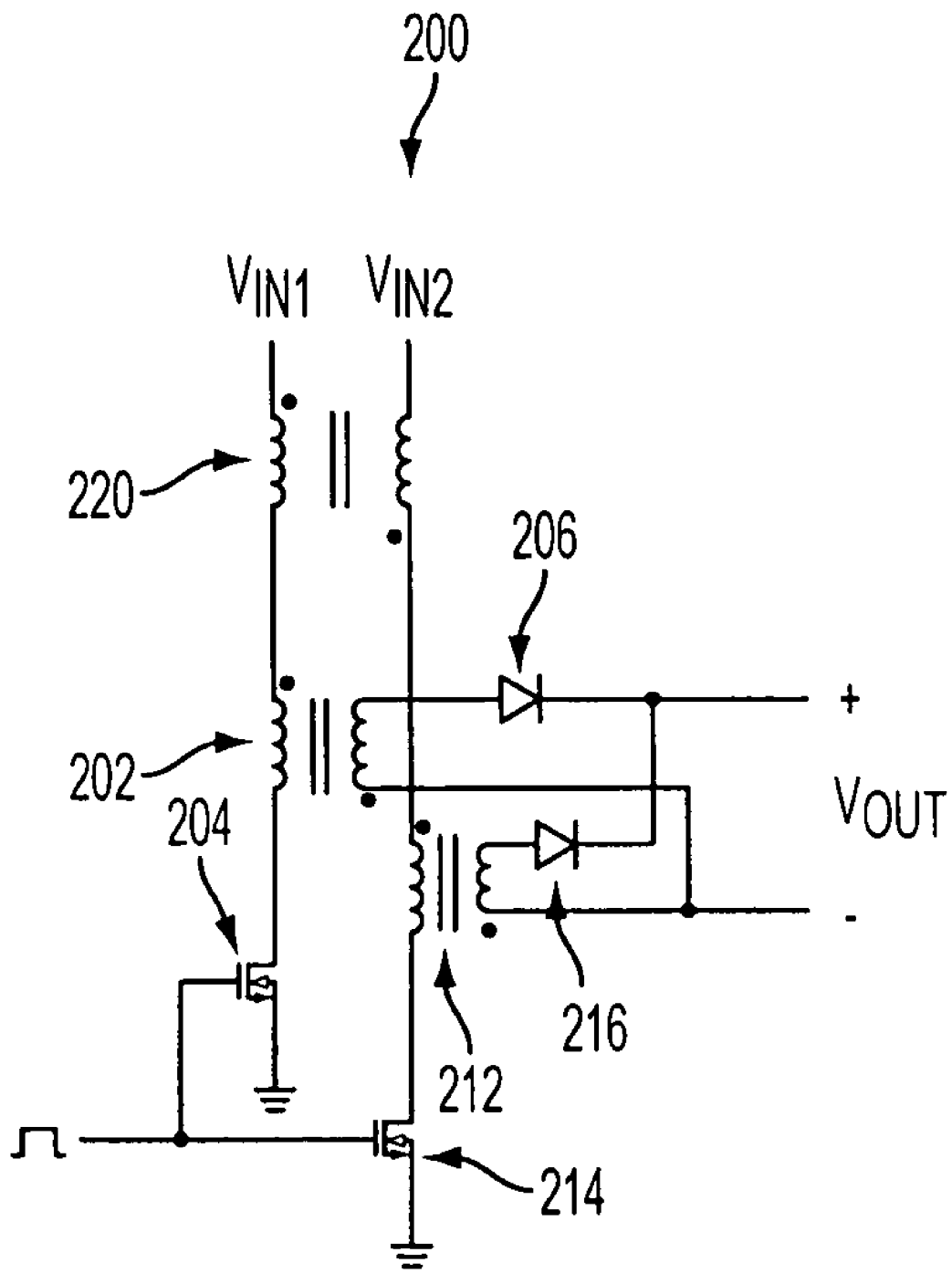
FIGS. 3A-3E are diagrams illustrating exemplary embodiments of the present disclosure utilizing one or more multiple-input inductors coupled to switching regulators to force voltages at the inputs of the switching regulators to be equal.

In particular, FIG. 3A shows a two-input balancing circuit 200 having two flyback switching regulators associated with respective inputs $V_{IN1}$ and $V_{IN2}$. For example, the power supply inputs may share a common ground. Also, they may be electrically isolated from each other. Alternatively, the inputs may share a common supply and use separate ground.

Each of the switching regulators includes a transformer having primary and secondary windings coupled so as make the voltage across the secondary winding opposite in phase with respect to the voltage across the primary winding, a MOSFET switch coupled to the primary winding and a diode connected to the secondary winding. In particular, the switching regulator associated with the input $V_{IN1}$ includes a transformer 202, a MOSFET switch 204 and a diode 206; and the switching regulator associated with the input $V_{IN2}$ includes a transformer 212, a MOSFET switch 214 and a diode 216. The gates of the MOSFET switches 204 and 214 are controlled by a common pulse-width modulation (PWM) signal forcing the on-times of the switches to be equal. The PWM signal may be produced by a PWM control circuit. Outputs of the switching regulators are tied together to form a single output voltage Vout.

A dual-winding inductor 220 is connected between the primary winding of each regulator and the power supply inputs $V_{IN1}$ and $V_{IN2}$. The windings of the inductor 220 are coupled to provide opposite polarities of the voltages across the windings. This configuration enables the balancing circuitry 200 to equalize the voltages at the power supply inputs. In particular, if one of the switching regulators draws more current than the other due to an increase in its input voltage, the input voltage to that regulator will be reduced by the inductor 220. A the same time, the input voltage to the other regulator will be increased by the same amount, so that the both input voltages are forced to be the same. The resultant input voltage will be the average of the two input voltages $V_{IN1}$ and $VIN_2$ applied to the circuitry 200.

Accordingly, the balancing circuitry 200 will always draw the same current from each of the two power supply inputs, even if the input voltages $V_{IN1}$ and $V_{IN2}$ are significantly different. The flyback switching regulators may operate either in a continuous mode where the secondary current is always greater than zero, or in a discontinuous mode where the secondary current falls to zero in each switching cycle.

Figure 3B:
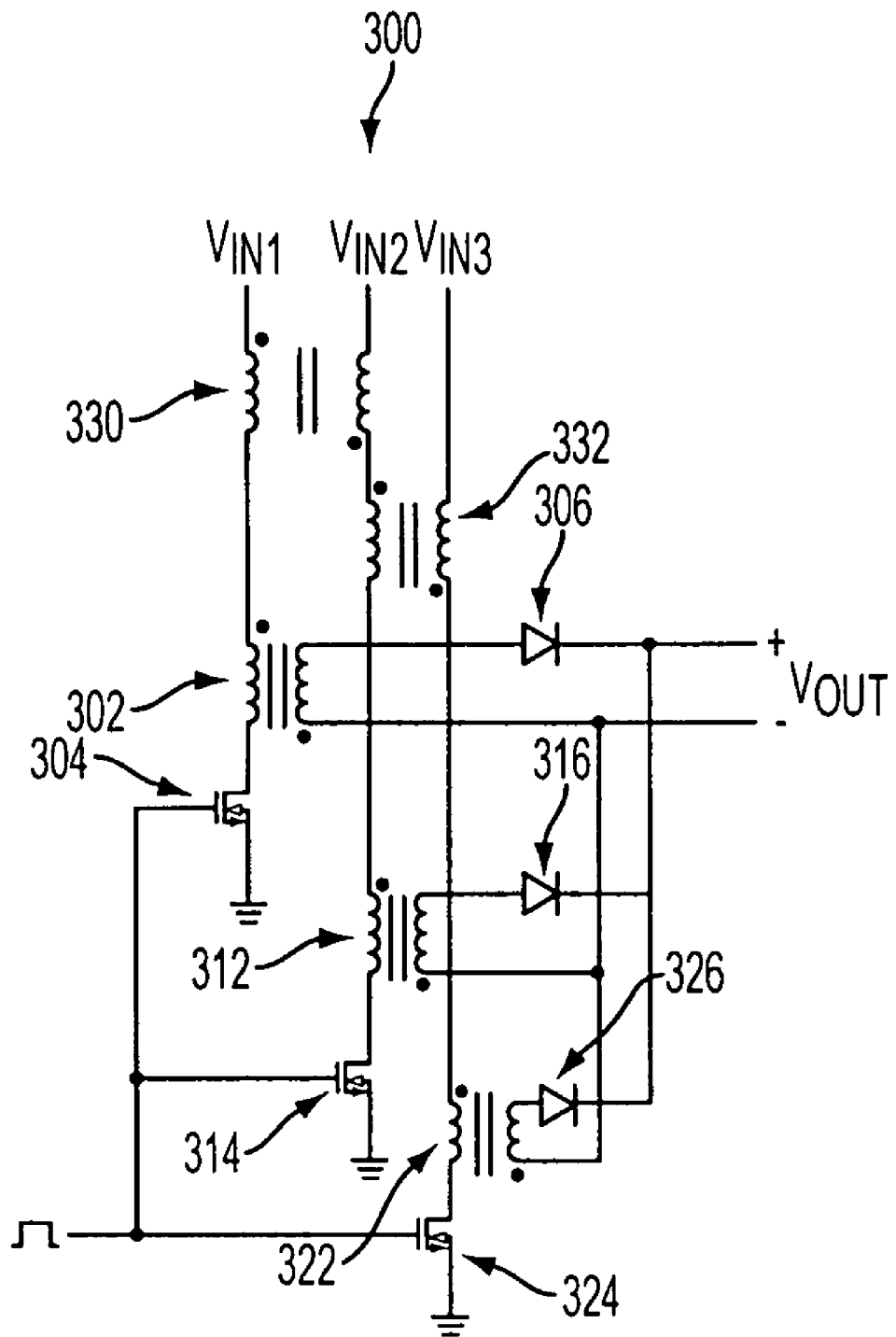

FIG. 3B shows balancing circuitry 300 having three power supply inputs $V_{IN1}$, $V_{IN2}$ and $V_{IN3}$, where the input $V_{IN2}$ acts as a "master" input and the other two inputs are forced to match it. The balancing circuit 300 includes three flyback switching regulators associated with the inputs $V_{IN1}$, $V_{IN2}$ and $V_{IN3}$. Each of the switching regulators includes a transformer having primary and secondary windings coupled so as make the voltage across the secondary winding opposite in phase with respect to the voltage across the primary winding, a MOSFET switch coupled to the primary winding and a diode connected to the secondary winding.

In particular, the switching regulator associated with the input $V_{IN1}$ includes a transformer 302, a MOSFET switch 304 and a diode 306; the switching regulator associated with the input $V_{IN2}$ includes a transformer 312, a MOSFET switch 314 and a diode 316; and the switching regulator associated with the input $V_{IN3}$ includes a transformer 322, a MOSFET switch 324 and a diode 326. The gates of the MOSFET switches 304, 314 and 324 are controlled by a common PWM signal forcing the on-times of the switches to be equal. Outputs of the switching regulators are tied together to form a single output voltage Vout.

A dual-winding inductor 330 is connected between the power supply inputs $V_{IN1}$ and $V_{IN2}$ and the primary windings of the regulators associated with these inputs. Another dual-winding inductor 332 is connected between the power supply inputs $V_{IN2}$ and $V_{IN3}$ and the primary windings of the respective regulators. Each of the inductors 330 and 332 is configured to provide opposite polarities of the voltages across their two windings. One winding of the inductor 332 is connected to the power supply inputs $V_{IN2}$ via the respective winding of the inductor 330. Hence, the power supply input $V_{IN2}$ provides a "master" leg that sets the input voltage value. The arrangement of the inductors 330 and 332 causes the input voltages $V_{IN1}$ and $V_{IN3}$ to become equal with the input voltage $V_{IN2}$. As all switching regulators run with the same switching duty cycle, the current drawn from the inputs with matched voltages are equal.

Figure 3C:
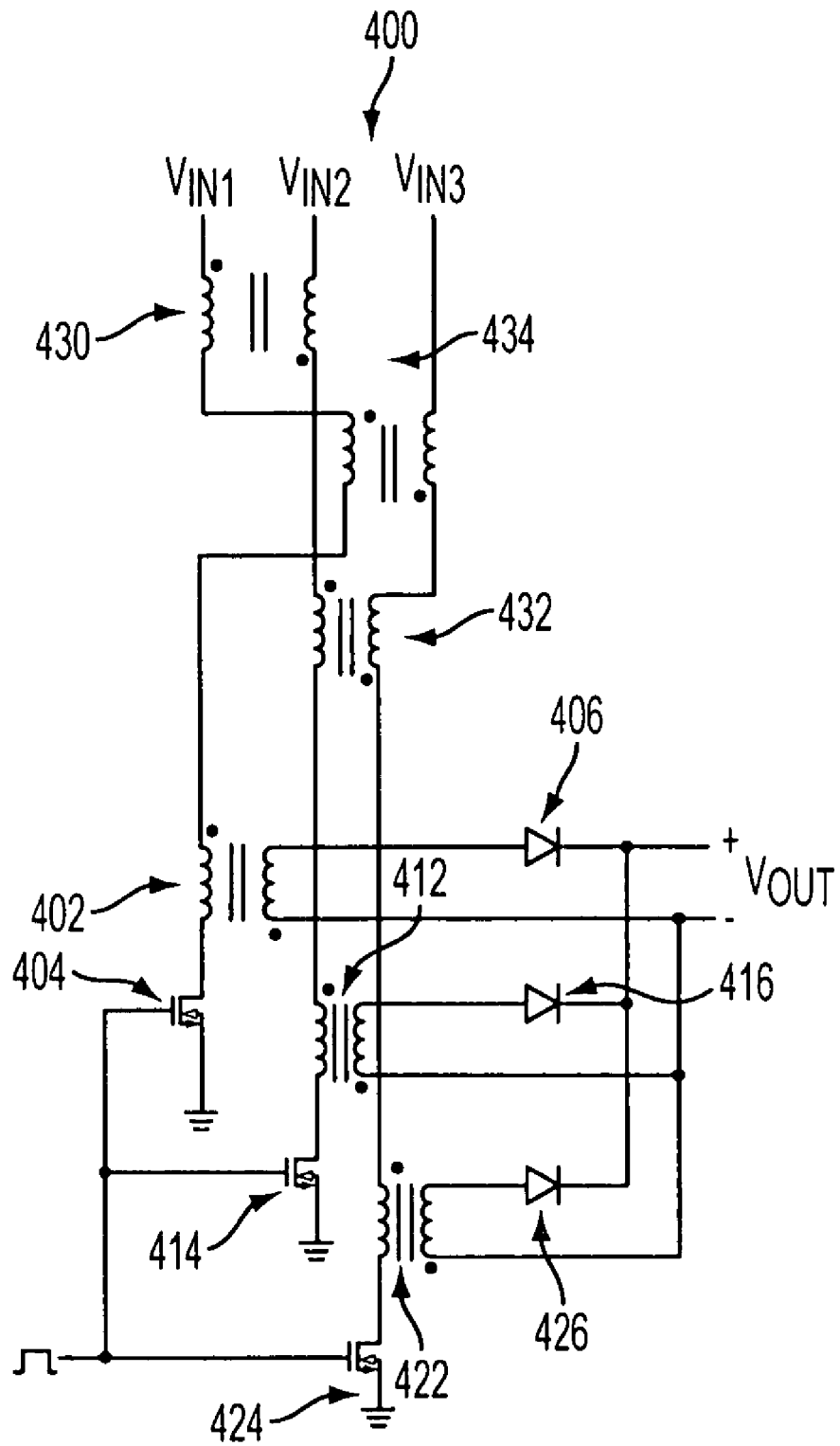

FIG. 3C shows balancing circuitry 400 having three power supply inputs $V_{IN1}$, $V_{IN2}$ and $V_{IN3}$ and three dual-winding inductors. The balancing circuit 400 also includes three flyback switching regulators associated with the inputs $V_{IN1}$, $V_{IN2}$ and $V_{IN3}$. Each of the switching regulators includes a transformer having primary and secondary windings coupled so as make the voltage across the secondary winding opposite in phase with respect to the voltage across the primary winding, a MOSFET switch coupled to the primary winding and a diode connected to the secondary winding.

In particular, the switching regulator associated with the input $V_{IN1}$ includes a transformer 402, a MOSFET switch 404 and a diode 406; the switching regulator associated with the input $V_{IN2}$ includes a transformer 412, a MOSFET switch 414 and a diode 416; and the switching regulator associated with the input $V_{IN3}$ includes a transformer 422, a MOSFET switch 424 and a diode 426. The gates of the MOSFET switches 404, 414 and 424 are controlled by a common PWM signal forcing the on-times of the switches to be equal. Outputs of the switching regulators are tied together to form a single output voltage Vout.

A dual-winding inductor 430 is connected between the power supply inputs $V_{IN1}$ and $V_{IN2}$ and the primary windings of the regulators associated with these inputs. A dual-winding inductor 432 is connected between the power supply inputs $V_{IN2}$ and $V_{IN3}$ and the primary windings of the respective regulators. Finally, a dual-winding inductor 434 is connected between the power supply inputs $V_{IN1}$ and $V_{IN3}$ and the primary windings of the respective regulators. Each of the inductors 430, 432 and 434 is configured to provide opposite polarities of the voltages across their two windings. The inductor 434 is connected to the input $V_{IN1}$ via one winding of the inductor 430, whereas the inductor 432 is connected to the input $V_{IN2}$ via the other winding of the inductor 430. Further, the inductor 432 is coupled to the input $V_{IN3}$ via the winding of the inductor 434.

The configuration of the inductors allows the balancing circuitry 400 to equalize current drawn from all three inputs. For example, when the regulator associated with the input $V_{IN1}$ draws more current than the other regulators due to an increase in its input voltage, the input voltage to that regulator will be reduced by the inductors 430 and 434 connected between the regulator and the input $V_{IN1}$. At the same time, the inductors 430 and 434 will increase the input voltage to the other two regulators by the same amount. Hence, voltages at the inputs of all regulators will become equal. As all switching regulators run with the same switching duty cycle, the current drawn from the inputs will also become equal.

Figure 3D:
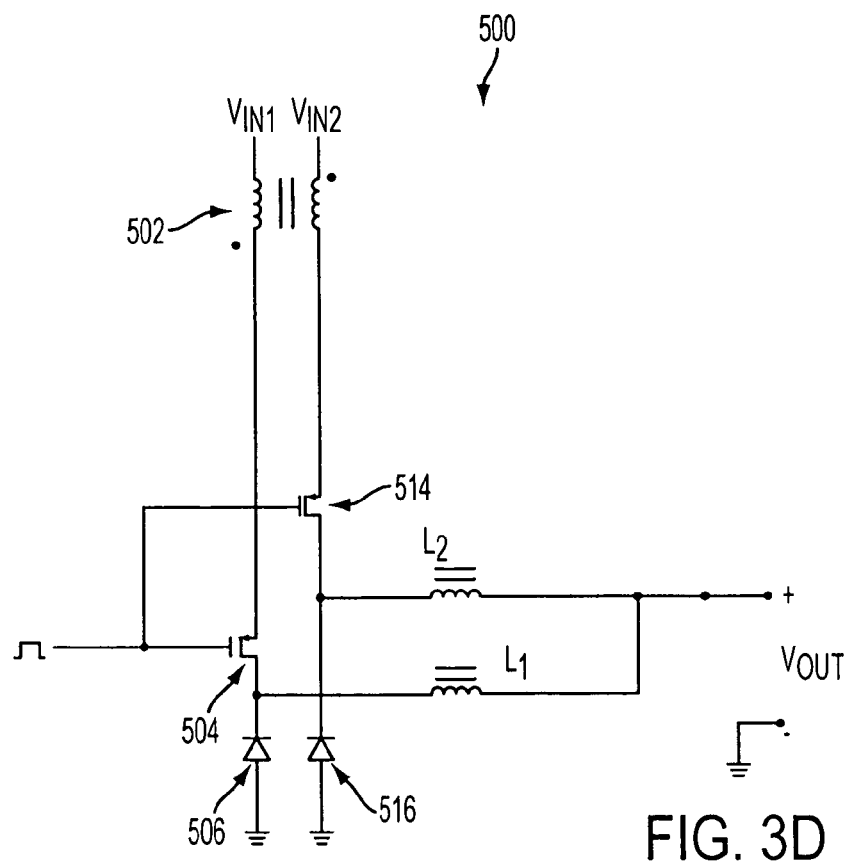
Figure 3E:
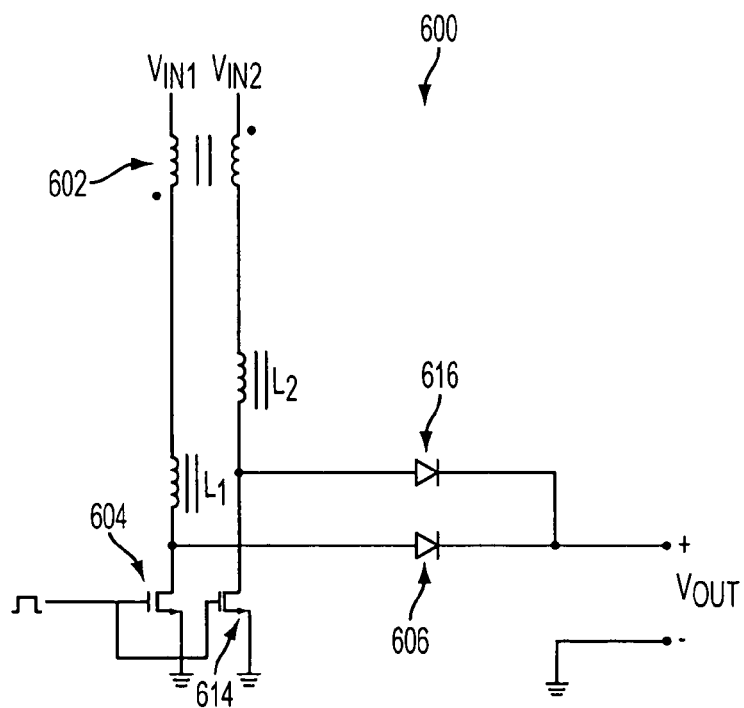

FIGS. 3D and 3E illustrate examples of balancing technique of the present disclosure, in which switching regulators include inductors instead of transformers. In particular, FIG. 3D shows balancing circuitry 500 including a dual-winding inductor 502 coupled between the power supply inputs $V_{IN1}$ and $V_{IN2}$ and a pair of switching regulators operating in a buck mode. The switching regulator associated with the input $V_{IN1}$ includes an inductor $L_1$, a MOSFET switch 504 and a diode 506; and the switching regulator associated with the input $V_{IN2}$ includes an inductor $L_2$, a MOSFET switch 514 and a diode 516.

The MOSFET switches 504 and 514 are arranged between the power supply inputs $V_{IN1}$ and $V_{IN2}$ and the respective inductors $L_1$ and $L_2$. The gates of the MOSFET switches 504 and 514 are controlled by a common pulse-width modulation (PWM) signal forcing the on-times of the switches to be equal. The PWM signal may be produced by a PWM control circuit. The inductors $L_1$ and $L_2$ are coupled to each other to form a single output voltage Vout.

The windings of the dual-winding inductor 502 are coupled to provide opposite polarities of the voltages across the windings. If one of the switching regulators draws more current than the other due to an increase in its input voltage, the input voltage to that regulator will be reduced by the inductor 502. A the same time, the input voltage to the other regulator will be increased by the same amount, so that the both input voltages are forced to be the same. The resultant input voltage will be the average of the two input voltages $V_{IN1}$ and $V_{IN2}$.

Accordingly, the balancing circuitry 500 will always draw the same current from each of the two power supply inputs, even if the input voltages $V_{IN1}$ and $V_{IN2}$ are significantly different.

FIG. 3E shows balancing circuitry 600 including a dual-winding inductor 602 coupled between the power supply inputs $V_{IN1}$ and $V_{IN2}$ and a pair of switching regulators operating in a boost mode. The switching regulator associated with the input $V_{IN1}$ includes an inductor $L_1$, a MOSFET switch 604 and a diode 606; and the switching regulator associated with the input $V_{IN2}$ includes an inductor $L_2$, a MOSFET switch 614 and a diode 616.

The inductors $L_1$ and $L_2$ are arranged between the power supply inputs $V_{IN1}$ and $V_{IN2}$ and the respective MOSFET switches 604 and 614. The gates of the MOSFET switches 604 and 614 are controlled by a common pulse-width modulation (PWM) signal forcing the on-times of the switches to be equal. The diodes 606 and 616 connected to the respective inductors $L_1$ and $L_2$ are coupled to each other to form a single output voltage Vout.

The windings of the dual-winding inductor 602 are coupled to provide opposite polarities of the voltages across the windings. Therefore, both input voltages are made equal, and the same current is drawn from each of the two power supply inputs.

Although FIGS. 3A-3E show the balancing circuits having a single output, one skilled in the art would realize that multiple outputs may be provided in accordance with the present disclosure. For example, multiple outputs may be generated by providing multiple secondary windings in the transformer of each flyback switching regulator in FIGS. 3A-3C. The arrangements of flyback switching regulators with multiple outputs are well known to those skilled in the art of switching regulators.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A power supply circuit comprising:
   multiple power supply inputs including first and second power supply inputs for respectively receiving first and second input voltages,
   multiple switching regulators associated with the respective power supply inputs, and
   a first multiple-input inductor coupled between the power supply inputs and the switching regulators for balancing voltages applied to each of the switching regulators, the first multiple-input inductor having first and second windings respectively connected to the first and second power supply inputs for respectively receiving the first and second input voltages, so as to provide respective voltages of opposite polarities across the first and second windings.

2. The circuit of claim 1, wherein the first multiple-input inductor is configured for drawing equal amounts of current from the multiple power supply inputs.

3. The circuit of claim 1, wherein the multiple switching regulators are controlled to maintain a common switching duty cycle for all of the switching regulators.

4. The circuit of claim 1, wherein input currents drawn from the power supply inputs are maintained at a predetermined ratio.

5. The circuit of claim 1, wherein the multiple power supply inputs further include third power supply input, and the multiple switching regulators include first, second and third switching regulators respectively coupled to the first, second and third power supply inputs.

6. The circuit of claim 5, wherein the first multiple-input inductor is coupled between the first and second power supply inputs, and the first and the second switching regulators; and a second multiple-input inductor is coupled between the second and third power supply inputs, and the second and third switching regulators.

7. The circuit of claim 6, wherein the second power supply input is configured as a master input, and the first and third power supply inputs are configured to provide input signals matching an input signal at the second power supply input.

8. The circuit of claim 5, wherein the first multiple input inductor is coupled between the first and second power supply inputs, and the first and second switching regulators; a second multiple-input inductor is coupled between the second and third power supply inputs, and the second and third switching regulators; and a third multiple-input inductor is coupled between the first and third power supply inputs, and the first and third switching regulators.

9. The circuit of claim 1, wherein the power supply inputs share a common ground.

10. The circuit of claim 1, wherein the power supply inputs are electrically isolated from each other.

11. The circuit of claim 1, wherein the power supply inputs share a common supply and use separate grounds.

12. The circuit of claim 1, wherein the switching regulators have a flyback configuration.

13. The circuit of claim 1, wherein the switching regulators have a buck configuration.

14. The circuit of claim 1, wherein the switching regulators have a boost configuration.

15. The circuit of claim 1, wherein each of the switching regulators includes a transformer.

16. The circuit of claim 1, wherein each of the switching regulators includes an inductor.

17. The circuit of claim 1, wherein the switching regulators are configured to provide a single power supply output of the power supply circuit.

18. The circuit of claim 1, wherein the switching regulators are configured to provide multiple power supply outputs of the power supply circuit.

19. A method of balancing current drawn from multiple power supply inputs including first and second power supply inputs for respectively receiving first and second input voltages, comprising the steps of:
converting voltages supplied from the power supply inputs using respective switching regulators, and
balancing voltages applied to the switching regulators from the power supply inputs using a multiple-input inductor having first and second windings respectively connected to the first and second power supply inputs for respectively receiving the first and second input voltages, so as to provide respective voltages of opposite polarities across the first and second windings.

* * * * *